United States Patent [19]

Weckenmann et al.

[11] 4,131,772
[45] Dec. 26, 1978

[54] SWITCHBOX AND CONTROL UNIT ASSEMBLY FOR AUTOMOTIVE VEHICLES

[75] Inventors: Albert Weckenmann, Ahrensburg; Rolf Bräuticam; Lothar Haas, both of Nüremberg, all of Germany

[73] Assignee: Robert Bosch GmbH, Stuttgart, Germany

[21] Appl. No.: 772,521

[22] Filed: Feb. 28, 1977

[30] Foreign Application Priority Data

Mar. 30, 1976 [DE] Fed. Rep. of Germany ....... 2613525

[51] Int. Cl.² .................. H01H 9/00; B60K 35/00
[52] U.S. Cl. .................. 200/61.54; 361/331; 361/428; 200/DIG. 1; 200/61.27
[58] Field of Search ............. 361/337, 376, 331, 350, 361/353, 397–399, 428; 200/61.27, 61.3, 61.34, 61.35, 61.54, 61.57, 292, DIG. 1

[56] References Cited

U.S. PATENT DOCUMENTS

| 3,573,558 | 4/1971 | Babcock | 361/399 |
|---|---|---|---|
| 3,715,540 | 2/1973 | Larson | 200/DIG. 1 |
| 3,830,979 | 8/1974 | McIntosh | 361/398 X |
| 3,831,063 | 8/1974 | Keough | 361/399 X |
| 4,016,490 | 4/1977 | Weckenmann et al. | 200/DIG. 1 |

FOREIGN PATENT DOCUMENTS

| 1905774 | 8/1970 | Fed. Rep. of Germany | 200/61.54 |
| 1005743 | 9/1965 | United Kingdom | 200/61.54 |

Primary Examiner—James R. Scott
Attorney, Agent, or Firm—Flynn & Frishauf

[57] ABSTRACT

To mount control switches for convenient operation by the operator of motor vehicles, a cantilevered, free standing multi-faceted elongated hollow box like structure is secured to the steering post housing so that it is located between the steering wheel and the dashboard, spaced from the dashboard. A plurality of touch-sensitive switches are located on the surfaces of the structure defined by the facets thereof. The structure includes printed, or integrated circuits to which the switches are connected which, in turn, are attached to a cable which is separably connected to the cabling of the vehicle. Preferably, discrete switch functions, such as headlight energization, windshield wiper controls, and the like are mounted on discrete, different surfaces of the box like structures, whereas similar functions with different control effects, such as windshield wiper speed can be mounted on the same surface, so that erroneous operation of a switch will not initiate an erroneous function, but at best only an erroneous mode of operation of the selected function.

33 Claims, 4 Drawing Figures

SWITCHBOX AND CONTROL UNIT ASSEMBLY FOR AUTOMOTIVE VEHICLES

CROSS REFERENCE TO RELATED APPLICATIONS, ASSIGNED TO THE ASSIGNEE OF THE PRESENT APPLICATION

U.S. Ser. No. 637,181, filed Dec. 3, 1975, now U.S. Pat. No. 4,016,490, by the inventors hereof, Weckenman et al. U.S. Ser. No. 771,806 filed Feb. 24, 1977, now U.S. Pat. No. 4,107,555 Haas et al.

FIELD OF THE INVENTION

The present invention relates to a switchbox and control unit assembly to position, retain and connect operating switches controlling various operation functions in automotive vehicles, and more particularly to an integrated separate assembly unit arranged for combination with an attachment to structural elements of an automotive vehicle so that the switchbox and control unit can be separately assembled, replaced, tested, or repaired apart from the dashboard of the motor vehicle.

BACKGROUND AND PRIOR ART

It has previously been proposed to locate selected operating switches to control various functions of the motor vehicle mechanism on a freely supported control structure located behind (with respect to the driver) the steering wheel. Usually, such structures are operating levers, for example, for direction signals or the like. They may, additionally, be supplied with pushbuttons or flick-switches, rotary switches, or the like to control lighting, windshield wipers, or other functions such as, for example, automatic speed control systems or the like.

The usual free standing control element secured to the housing of the steering post of the motor vehicle hold only a minor portion of the operating switches used in the vehicle. The distribution of the control switches, therefore, is separated between certain switches being located on the dashboard and others on free standing elements secured to the steering post, or its housing. This decreases the ready supervision of the switches and complicates operation. Combining operating switches with operating levers may lead to erroneous operation, since operation of pressure switches, flip-switches or rotary switches frequently leads to additional bending stresses being placed on the lever itself, althought such bending force was not intended by the user. This leads to undesired initiation of the additional operating function controlled by a force applied to the lever itself, for example, connection of a blinker light, turn signal indicators, windshield wipers, windshield washers, or the like.

THE INVENTION

It is an object to provide a control unit for use in automotive vehicles in which most, if not all of the usually used, or engaged operating switches are combined, and placed conveniently close to the steering wheel of the vehicle. It is an important feature of the present invention to simplify the actual operating steps, or movements required of the driver and to so place and shape the respective switches that erroneous operation is effectively prevented, even under stress of critical traffic situations.

Briefly, the switches are located on a elongated multi-faceted hollow body, preferably of box like structure, which can be arranged in free-standing form to project laterally from the steering post below the steering wheel, preferably by being secured to the steering post housing. The hollow body is, therefore, spaced from the dashboard of the motor vehicle. It carries a plurality of touch sensitive switches, located on the surface defined by the facets of the body. Surface supported circuits, such as integrated circuits, printed circuit boards and the like are located within the spaced defined interiorly of the hollow body. The circuits and connections are connected to a cable which passes out of the hollow body and terminates in a multi-connector plug or circuit for connection to a seperable connector for the distribution cabling or harnesses of the motor vehicle.

The switches are preferably proximity sensitive, that is, do not require mechanical movement. Thus, mere touching of the operating surface of the switch, in which the switch functions as a touch-sensor, effects switch operation. Other operating controls, e.g. touch surfaces, proximity surfaces and the like may be used. The structure permits combining the various switches in an easily accessible arrangement, and placing the switches in such a manner that spurious, or undesired operation is effectively inhibited. Even if the switchbox body should be bent by the user, no undesired or random switching operation will result since the switchbox itself no longer functions as an operating element for a mechanical switch. The internal wiring and connection, as well as logic connection of the switches — for example interlock of high and low beam driving lights — can be effected within the hollow body itself, and any other electrical circuit components for switch operation, as well as the circuit wiring can be located within the hollow body. This substantially reduces the wiring requirements for the vehicle as such and permits connecting the entire hollow body, as a unitary assembly and control unit to the harnesses or cables of the vehicle by a multi-terminal connector, with which the vehicle harness connectors, or connector, itself, can be engaged. Assembly of the switches and their connections is facilitated since the switchbox unit can be separately assembled, and the remainder of the vehicle connected thereto merely by then connecting the multi-terminal connectors.

The preferred form for the multi-faceted hollow body is an essentially flat, elongated rectangular box like structure, in which the surfaces are essentially plane, but need not necessarily be flat, nor need they be paired parallel with respect to each other. Preferably, the cross section of the body is compressed-rectangular. The smaller longitudinal surfaces of the body, in a preferred form of the invention, terminate short of the end surface so that a cut-off, tapered end is formed defining some of the facets of the body, in which each a touch switch sensor is located. So shaping the body that the end surfaces are formed, for example, by approximately 45° surfaces merging on the one hand into the longitudinal flat surfaces and, on the other, in the end surface is additional insurance against erroneous operation of the operating switches thereon since the shape of the body can readily be felt by the operator without looking at the structure itself, and since any surface of the structure will have only one switch function associated therewith, for example by having only one switch thereon. It is, of course, readily possible to place several touch sensitive switches on the same flat surface of the body; this is particularly so if the switches control various operating states, or operation modes of the same operating function, however, for example, various speeds of a windshield washer motor. Casual, erroneous operation of any one of the switches thus would not lead to initiation of erroneous function only erroneous mode, but of the desired function. Additional insurance against erroneous operation can be obtained, in accordance with a further feature of the invention by so locating the touch-sensitive switches that the operating surfaces thereof which actually respond to touch, or immediate proximity of a finger of the user are located somewhat below the surrounding surface of the switchbox and control unit itself. It is particularly desirable to surround the operating surfaces with beads, which can readily be sensed by the fingertip of the user, so that the respective switch can be sensed by the user before operating the switch itself. The bead is, preferably, extended above the surface of the switchbox so that casual movement of the user's hand over the switchbox will not result in undesired operation of any of touch-sensitive switches.

Operating functions which under no circumstances should be subject to casual mis-operation, for example, disconnection of headlights or the like can be additionally protected against erroneous operation by connecting two opposite located switches in a suitable circuit so that the respective function is initiated only if both oppositely located switches are engaged simultaneously. Thus, to so operate the switch would require the user to reach around the switch box with his fingers and, for example, touch two oppositely located switches at the same time by pinching the switchbox, at the switch location, between thumb and forefinger.

The switchbox can, additionally, carry contact-less switches located close to the attachment to the steering post, or steering post housing, which switches cooperate with which control elements, for example, optical or magnetic elements on the steering wheel itself, and connected to reset or cancel previously initiated turn signal operation upon reset of the steering wheel to straight-forward driving position.

The internal wiring of the switch unit is preferably a printed circuit; the switches themselves are, preferably, of the illuminated switch type, for example by locating a response indicator light immediately below the bead.

As used in the present specification, the term "surface supported circuit" is deemed to include both printed circuits, as well as integrated circuits which may also include themselves, active circuit components, and similar circuit structures which may include active and passive electrical and electronic network elements.

BRIEF DESCRIPTION OF THE DRAWINGS

The invention is described by way of example with reference to the accompanying drawings, wherein.

DESCRIPTION OF THE PREFERRED EMBODIMENTS

The unit is shaped, essentially, as an elongated, faceted hollow box-like structure of approximately rectangular cross section, tapering to a narrowed portion adjacent its attachment end. The body 1 preferably is a unitary plastic unit, made, for example, of a suitable thermo setting plastic as one integral element with a removable side to form a cover for access toward the interior. The various operating switches 2 for functions needed or desirable in an automotive vehicle are switches adapted for tactile operation, preferably proximity, or touch-sensitive switches which are located on flat surfaces 3 of the outer surface of the body 1. The functions which are, technically, commanded by the switches on the body are on-off operation of lights, windshield wiper, windshield washer, direction signals, high-low beam control, momentary light control for flashing, and the like.

Figure 3:
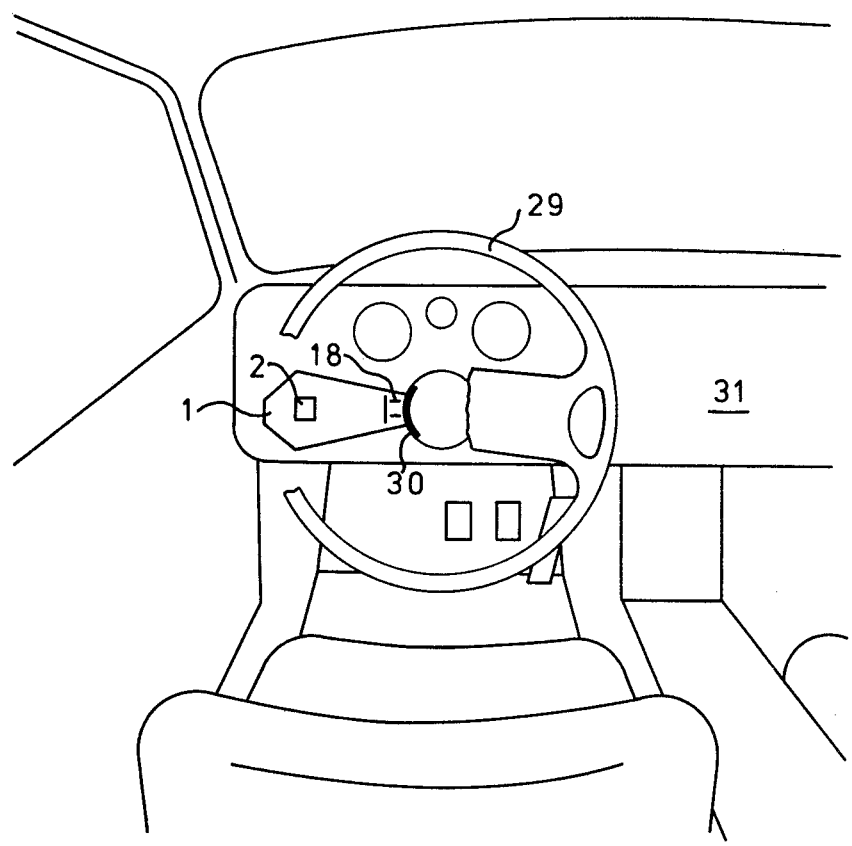
FIG. 3 is a general perspective view from immediately behind the driver's seat of a passenger motor vehicle towards the dashboard and illustrating placement of the switchbox and control unit assembly, with the steering wheel partly broken away.

The attachment of the body 1 to the steering post, or steering post housing or cowling of the motor vehicle is effected by an attachment end 7 formed with attachment holes 6 adapted for engagement by suitable screws. The attachment section 7 itself is formed as an angled end element 5, for example integrally molded to the end 4 of the box structure 1. The entire unit, together with the switches 2 is, ordinarily, secured by means of the end section 7 laterally on the steering post or steering post cowling of the motor vehicle, as best seen in FIG. 3. The particular way of attachment is well known and can be suitably arranged, for example, similar to the attachment of direction signal control levers. The entire unit may be referred to as an operating post, or operating box, or as a steering posts control unit.

The structure 1 is laterally secured, in cantilever fashion, supporting the structure 1 freely in front of and spaced from the dashboard 31 (FIG. 3) of the motor vehicle. It is so arranged that the end surface 8 (FIG. 1) remote from the end portion 4 adjacent the attachment side of the element is located below, or beneath the general plane of the steering wheel 29, projecting laterally from the steering post and facing the operator of the vehicle.

It is desirable to locate switches which are associated with different functional characteristic on different surfaces of the switch unit. Thus, the various switches 2 are so located on the surface of the unit 1 that each one of them, or a group thereof have a different surface associated therewith. In order to provide more than the 5 end surfaces of a rectangular box-like structure attached at one end, the corners of the structure are faceted to provide additional surfaces 3.8, each one of which support a respective switch 2.8. The various surfaces at the free end portion are the faceted surfaces herein referred to.

Figure 1:
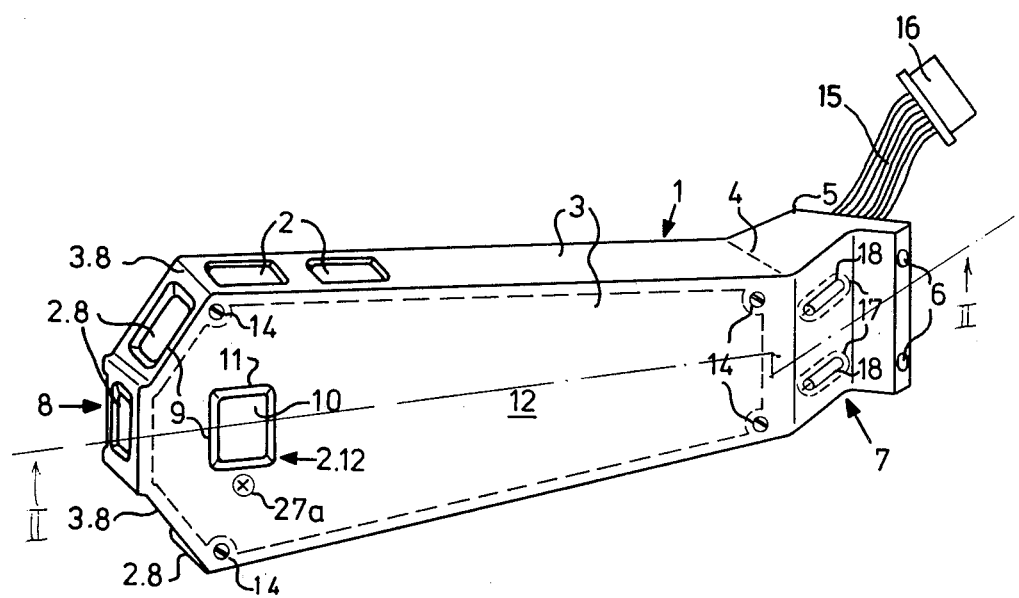
FIG. 1 is a general perspective view of a switchbox unit adapted for attachment to the steering post housing, or steering post cowling of a motor vehicle.

More than one sensing — touch-sensitive switch can be located on any one surface if malfunction, or erroneous operation of a switch is not material to safety, or operability of the vehicle. FIG. 1 illustrates two switches at the upper narrow side of the structure 1. These switches may, for example, be associated with the windshield washer motor, each one of them controlling a specific speed of the motor, or, for example, commanding continuous windshield wiper operation for one switch, intermittent operation for another, and intermittent with a different duty cycle for a third. To command windshield wiper operation, the operator need only move his finger along the respective surface 3 of the body 1 until he has sensed a projecting bead formed on the switch that he has selected and then engage the switch centrally to control the switch by touch. If, however, a wrong switch should be operated, no harm is done if the function of the switches along one surface are similar; for example, if intermittent operation has been intended but continuous operation has been actually commanded, it is then an easy matter to switch over. No dangerous operating condition will have arisen.

The operating switches are distributed on various surfaces 3 of the unit 1 in accordance with their function in order to enhance accuracy of use by the driver; this is not the only insurance against erroneous operation, however. Switches 2, in the form of touch control switches, are so placed in engagement openings 9 (FIGS. 1, 2) within the surface of the body 1 that the touch surface 10 of any one switch 2 is located slightly below the associated plane of surface 3 of the body 1. Thus, operation of the corresponding switch 2 requires intended movement of the fingertip to the gripper opening 9. Suitable recess dimension is a few millimeters below the respective surface 3,3.8. This prevents switch operation by merely moving the hand over the surface of the body 1 and unintented operation of any one of the switches 2. Operating safety and insurance against erroneous operation of the switches 2 is enhanced by surrounding the gripper openings 9 by a bead 11 which extends at an inclination from the plane 3 of the surface 1 towards the touch surface 10. Preferably, the edge 11 projects slightly over the plane 3 to form a slightly projecting bead which additionally decreases probability of erroneous operation of any one of the switches 2, as clearly seen in FIG. 2 with respect to the bottom switch, showing an overlapping edge portion 11.

It has been found desirable to locate switches with respect to any one function at opposite surfaces of the bodies 1, so that the switches themselves can be located diametrically opposite each other. The association of two touch-control switches 2 at diametrically positioned opposite surfaces preferably is so arranged that one of the switches is used to command an ON operation, the other switch commanding an OFF operation. In another form of the invention, and particularly with respect to surfaces which are close together so that they can readily be engaged between the thumb and forefinger of any operator, the switches can be so associated that the control unit 1 must be gripped between thumb and forefinger, for example, of the user, that is, surrounded by the hand of the driver, with the fingertips engaging opposed switches 2. The desired operating function is then effected only if both opposed switches are simultaneously engaged. This additionally increases the operating reliability, for example sequential ON/-OFF operation of lights, or the like. The switches can, of course, be so wired with respect to additional switch control circuitry, such as relays, which may be wire wound or solid state, that one operation commands ON of the desired function, and a succeeding operation commands OFF of the same function, for example, operation of headlights.

One of the wider sides of the essentially rectangular cross sectional structure 1 is formed as a removable cover 12. Removal of the cover 12 by removal of screws 14 provides access to the various switches 2, and the electronic circuitry therein. A typical circuit board is shown at 13, FIG. 2. The electronic circuitry within the hollow structure 1, itself, can be formed in any suitable way, and the term "surface supported circuit" herein is intended to cover not only printed circuit boards, but additionally integrated circuits and may, further, include active and passive electronic elements. The printed circuit board 13, therefore, should be considered only as an example of such a surface supported circuit and may, itself, support additional surface supported circuits, for example, of the integrated circuit (IC) type.

Figure 2:
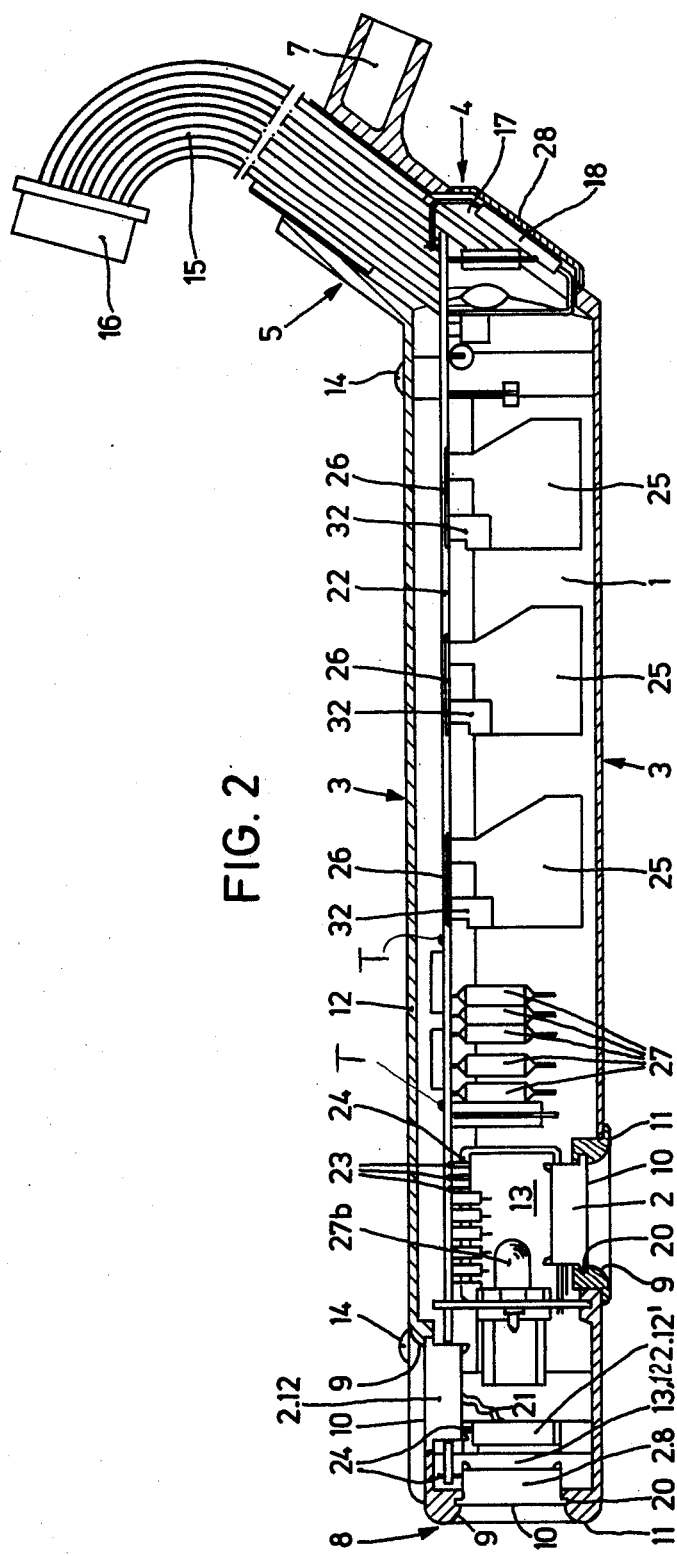
FIG. 2 is a horizontal sectional view along line II—II of FIG. 1 in which the removable cover is located, however, on the side opposite that shown in FIG. 1.

For purposes of illustration, FIG. 1 fits the cover 12 to provide access to the interior of the body 1 at the side facing the driver; in the usual embodiment, however, it is preferred to place the cover 12 as illustrated in FIG. 2, that is, at the side remote from the driver of the vehicle. Various ways of securing the cover in the structure are possible; FIG. 1 shows screws 14; it may also be not in a one piece element, or the structure 1 can be formed with grooves in which projecting ledges on the cover can be engaged so that the cover can be slid longitudinally into the groove and held in position, for example by a snap catch, by a single screw, or the like.

All electrical connections to and from the surface supported circuit 13 terminate in a wiring harness cable 15 extending, preferably as a flat conductor from the angled attachment portion. The cable 15 itself terminates in a multi-terminal connector 16. Assembling the control unit 1, which will contain practically all electrical control connections necessary or desirable for the function of the motor vehicle into the vehicle itself thus merely requires mechanically attaching the unit 1 to the steering post, its housing or cowling by suitable screws, and engaging the multiple connector 16 to a suitable connecting element which is then, in turn, connected to the wiring harness of the vehicle. This substantially simplifies wiring of the switch connections necessary or desirable for control of electrical functions of an automotive vehicle, and also substantially simplifies and speeds maintenance and repair by personnel not necessarily skilled in maintenance and repair of the electrical control functions of a vehicle. Replacement or repair of individual switches can readily be affected by replacing the entire unit, thus permitting immediate resumption of operation of the vehicle, with eventual repair of an individual switch in the unit being carried out as a shop rebuilding procedure, when time permits by suitably trained personnel.

In a preferred form of the invention, the box-like structure 1 is attached to the steering post, or steering post housing, or steering post cowling of the motor vehicle. This permits constructing the unit in such a manner that it can also include the reset elements for the direction signal blinkers. Recesses 17 are formed adjacent the attachment end 7 of the box-like structure. Contact-less switch 18, for example, magnet controlled switches, or optical switches or transducers are located in the recesses, and are operated upon turning movement of the steering wheel 29 by a suitable reset magnet 30 (FIG. 3), to effect reset, or cancellation of a previously commanded turn signal flash indication. A suitable control system is described in German disclosure document DE-OS 24 60 918, of June 21, 1976.

FIG. 2 illustrates, in simplified form the general principle of the interior of the structure, taken as a section through the central plane of the box-like structure 1. The cutting plane is perpendicular to the plane of surface 3 of the removable cover 12, but off-set or angled in the region of the end piece 7, angled off from the remainder of the structure, so that the section plane will pass through and illustrate one of the switches 18.

The sensing switches 2 are inserted by means of flanges 20 in suitable grooves formed in the material of the bead, or surrounding frame or bulge 11. The switch 2.12 in the cover 12 (FIG. 2) is connected to an interiorly located response circuit, or response element 2.12'. Thus, the surface is interiorly connected to the sensing element 2.12' which, in turn, is associated with a response circuit 13.12. The edge 11 which frames the touch surface 10 is likewise located in a suitable opening in the associated surface 3 of the hollow body, or structure 1. The touch sensitive switch 2 is electrically and mechanically connected with its side remote from the touch surface to a printed circuit 13. Printed circuit 13 is arranged to provide the electrical network for the operation of the touch sensitive switches 2, as explained, for example, in U.S. Pat. No. 4,016,490, Weckenmann et al., assigned to the assignee of the present application, the disclosure of which is hereby incorporated by reference. Switches, as described in U.S. Pat. No. 771,806, filed Feb. 24, 1977, now U.S. Pat. No. 4,107,555, Haas et al may also be used.

Some switches, for example, the switch 2.12 which is secured to the removable cover 12 is preferably connected to the printed circuit board, or its associated electronic element 13.12 by a flexible pigtail wire, rather than using a stiff fixed mechanical connection. The arrangement should be such that it is not necessary to remove the printed circuit element 13.12, which is electrically connected to the touch sensor 2.12 when the cover 12 is removed. This would not permit testing of the entire arrangement of the circuits in the unit after the cover is removed. By retaining a flexible connection between the element secured to the removed cover, it is possible to leave all elements on it and still have access to the interior of the hollow body 1, thus permitting testing of the unit with the electrical connections intact. The flexible pigtail line 21 (FIG. 2) connects switch 2.12 with the associated circuit element 13.12, thus insuring continuity of electrical connection of the associated touch switch 2.12 with the remaining portions of the circuit even after the cover 12 has been disassembled. Reference is made to German disclosure document DE-OS 25 49 588, and the underlying application of November 5, 1975 for technical details of interconnection of a sensing switch with its associated elements, and to the aforementioned Haas et al. application Ser. No. 771,806, filed Feb. 24, 1977, now U.S. Pat. No. 4,107,555.

A printed circuit board 22 extends practically throughout the entire length of the body, preferably located close to the removable cover 12, and parallel thereto. Electrical connection, and connection to the cable 15 is effected by means of the printed circuits 13 on the printed circuit board 22. Electrically functionally associated points of the printed circuits on the circuit board are formed with connections 23, attached to the printed circuit board 22, in the form of plug-and-socket connections, spring clip connectors or the like, or spring clip-solder connections to permit connection of the printed conductors on board 22 with associated contact pins 24 of the surface circuit element 13. Electrical connection can be reliably insured, and alignment maintained since the touch sensitive switch 2 and the associated circuit 13 is secured to the box structure, or the cover, respectively, by the edge 11, which is accurately positioned in the respective surface, or wall of the hollow body structure 1. The connection can be, as explained, by means of a snap-in engagement of a projection and a groove, by suitable adhesives, or the like. Thus, the respective contact pins 24 and the associated connections 23 can be in proper engagement.

It is also possible, and suitable in some embodiments to insert the edge or bead 11 into a slightly oversized opening formed in the wall of the hollow body 1 and then engaging contact pins 24 of the surface supported circuit 13 with the associated terminals 23 on the printed circuit board 22. After engagement, the connections can be soldered together from the back, with the cover 12 removed. The solder connection, therefore, will be in the inside, and on the side remote from the facing surface of the touch sensitive switches. By appropriate positioning on the printed circuit board 22, the switches 2 will be permanently located, extending through appropriate openings in the respective wall of the body 1, and held reliably and securely by the solder connections in the back of the switches, and the associated circuits themselves.

It is theoretically possible to use a hollow switchbox construction with a large number of touch sensitive switches 2. In actual practice, and to insure safety of operation of the motor vehicle with which the switches are to be used, it is preferred to apply switches only in the region adjacent to the free end 8 of the body 1. The space in the remainder of the hollow body is not wasted, however; in accordance with the feature of the invention, the remaining space of a hollow body 1 is used to support and protect power stages 25, relays, or the like. The power stages may, for example, be electronic power switches, transfer relays, or similar electrical components used in the switching circuit of the vehicle. The power stages 25 are secured in holders 26 which can be located directly in suitable openings or otherwise attached to the printed circuit board 22. Thus, it is possible to carry out the interconnection of the electrical functions between the various functional groups of the electrical system of the vehicle within the hollow structure 1 by appropriate interconnection of the conductive paths, or strips on the printed circuit board 22. This has the single advantage that expensive manual connection of cables within the vehicle itself need not be made; additionally, however, connecting points and test points T can be formed and so indicated on the printed circuit board 22 that maintenance, and testing of the electrical circuit can be readily carried out with respect to a major portion of the electrical network of the vehicle by merely removing the cover 12, at which point the printed circuit board will become accessible.

FIG. 2 illustrates additional elements 27 used to interconnect the various surface supported circuits 13. The elements 27 can be directly attached to the printed circuit board 22. The switches preferably have signal lights associated therewith. The signal lights may be separate lightbulbs, for example, incandescent lamps, light emitting diodes, or the like, which are surface mounted or mounted behind jewels, as schematically shown at 27a in FIG. 1. Some of these switches, particularly those which are formed with surrounding beads of translucent material preferably have signal lights 27b located inside of the hollow body, immediately behind the translucent bead 11. Upon operation of the switch, the associated signal lamp 27b will be illuminated in accordance with the control function of the switch and the edge of the switch, or the switch surface will be flooded with light by conduction of light, similar to light conduction in light guides.

The recess 17 formed at the right side of the box-like housing structure 1 is used to receive contact-less switches 18 to be operated upon movement of the steering post in order to provide for automatically cancellation of direction signal indication. The recess 17 is closed off by a cover 28. Upon turning of the the steering wheel 29 (see FIG. 3), a magnetic trigger element on the steering post passes by the contact-less switch 18 which, preferably, are constructed as magnetically operated reed switches. A permanent magnet tape, ribbon, or strip 30 secured to the steering post will pass by the cover 28 upon rotation of the steering post due to rotation of the steering wheel 29. The reed switches will then be operated. The reed switches 18 are preferably located immediately above the electrical connection of the reed switches to the printed circuit board 22, as best seen at the right side of FIG. 2, and close to the connection of the cable 15 to the printed circuit board 22.

The general arrangement of a preferred form of the control unit is best seen in FIG. 3, which is a perspective view from the driver's seat towards the dashboard. The switchbox unit 1 is located between the steering wheel and the dashboard 31 of the vehicle; it is secured to the cowling, or housing of the steering post. The switchbox unit may also be located at other positions within the vehicle, the position shown in FIG. 3 being preferred.

The switches 2 respond to operation by the driver, or operator of the vehicle. They may be capacitative proximity switches, responsive to approach of the driver's hand, or finger, or to touching of the switches. If it is expected that the operator frequently uses the vehicle with heavy gloves — for example if the control unit is installed in trucks, tractors, agricultural vehicles or tractors, or the like, then mechanically movable switches, for example microswitches of the surface engageable contact type may be used. The particular type of switch unit installed on the switchbox itself can be matched to the particular operating requirements, or primarily intended uses. The term "touch-switch" adapted for tactile manipulation includes all such switches, whether operated by proximity to the switch, direct contact to the switch surface, or mechanical movement of the switch unit upon engagement therewith by the touch of the operator, for example, microswitches, rocker switches or the like.

Figure 4:
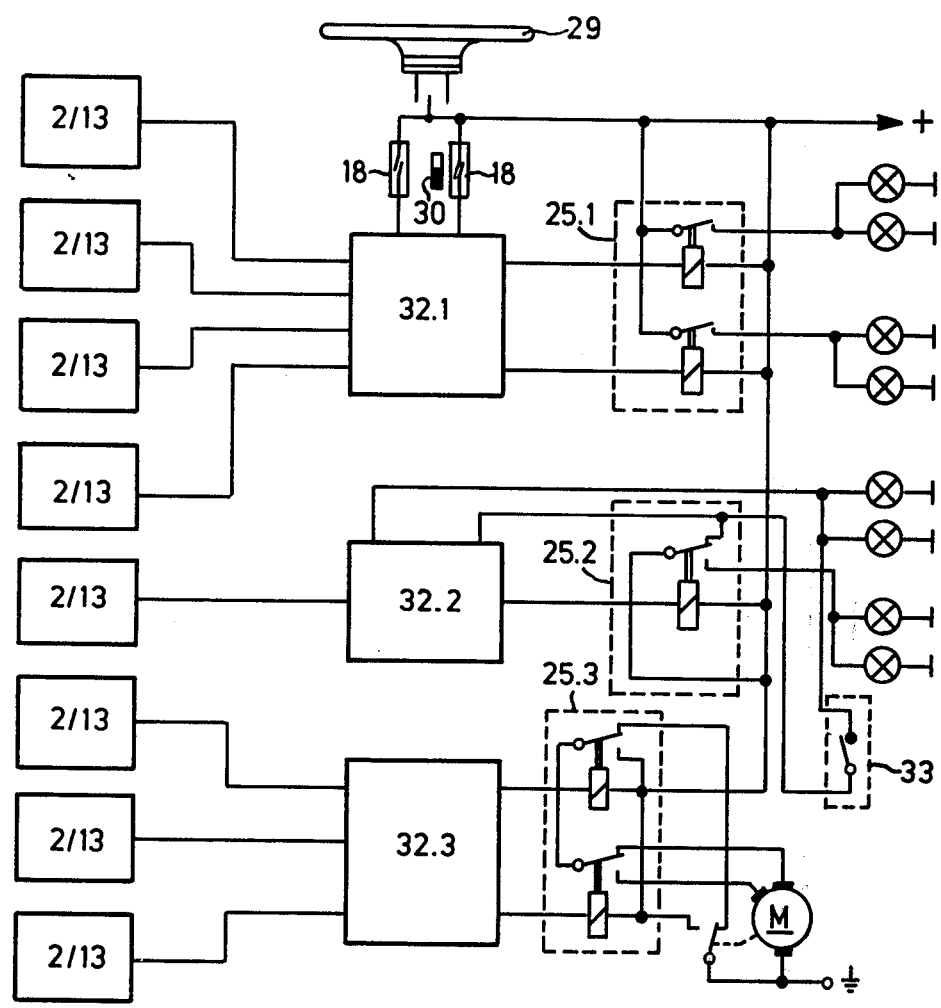
FIG. 4 is a schematic box circuit diagram illustrating the wiring of several illustrative touch-sensitive switch sensors, and their association in different functional operating groups to illustrate respective operations which are typical for a passenger motor vehicle.

The association of the various switches — of whatever type — with their associated printed circuits or integrated circuits, in short, with their surface supported circuits 13 and with the power stages 25 is shown in FIG. 4, which also illustrates a group of control units 32.1, 32.2, 32.3. The control units form control networks or circuits which, usually, would be integrated circuits in order to control predetermined logically coupled or interrelated functions.

The direction signal indicator cancellation switches 18 (FIG. 4) are operated upon proximity of magnet 30; the switches 18 are connected to control unit 32.1 which is further connected to associated switches 2 and their surface supported circuit 13 (shown in the drawing as 2/13) to effect the following functions: left ON; left OFF; right ON; right OFF. The output of the control unit 32.1 is connected to a suitable relay unit 25.1 and to the respective cables in motor vehicle leading to the respective indicator lamps. Simultaneous operation of the right and left ON switches is possible, so that the switches, when operated together, provide for operation of the warning blinker system, without requiring an additional switch — an operating function which is not possible when using a position-operated switch for left or right blinker operation. The control indicator lamps to indicate the selected function to the operator and forming part of the unit 1 have been omitted from the showing of FIG. 4.

A second control unit 32.2, and controlled by switches and integrated circuit combinations 2/13 is used to command energization of the headlights, both high-beam and low-beam, as well as headlamp flashing operation; the high low-beam switch 33 is additionally connected to the second control unit 32. The subsequent power stage 25.2 includes a transfer switch relay which alternatively commands control of the respective high-beam or low-beam filaments, or headlamps. Various other connections are possible.

Control unit 32.3 includes the functional program for operation of the windshield wiper and windshield washer. Control is selectively effected by means of 3 switches, inserted in the switch unit 1 as switches 2 with their associated integrated or otherwise surface supported circuits 13, commanding, respectively, different windshield wiper speeds, or intermittant windshield wiper operation. The output of the third control circuit 32.3 is conducted to respective transfer relays to control a multi-speed motor for operation of the windshield wipers, the relays 25.3, together, forming the power stage controlled by control unit 32.3. The special switch for operation of the windshield washer has been omitted from the showing of the drawing but can be connected similarly.

The various elements needed to assemble the switch unit as described, namely the switches 2, the surface supported circuits 13, power stages 25 and other elements are commercial articles of trade in the electrical and electronic field. Likewise, interconnecting elements 27 and other components are used in the electrical and electronic control of automotive vehicles and form direct components or accessories; if not directly available as commercial articles of commerce they can be readily combined from standardized logic circuit elements available on the open market to carry out the respective logic functions. Thus, repetitive operation of the same switch to effect SET-RESET mode is a standard flip-flop operation and commercial flip-flop circuits, for example, in integrated form, can be used and combined with other such integrated circuits.

The structure is particularly simple to manufacture and to maintain and additionally provides readily accessible and identifiable test points, permitting rapid testing of a multiplicity of functions without changing, substantially, the location of the test element, or the test prongs by merely moving them along the various test positions on the printed circuit boards 22. The cable itself is connected at one end to the printed circuit board which extends over essentially the entire length of the hollow body 1, and on which all the interconnection of the various functions are placed. Thus the cable connections themselves are straightforward and not requiring, among themselves, specific types of interconnections. The printed circuit board itself is preferably so located with respect to the removable cover of hollow body 1 that, after the cover has been removed, the printed circuit will expose various switching and test points particularly appropriate to test ability of the switches and the functions to be commanded, for example, by making resistance tests, energization tests, and the like.

The operating switches are preferably mechanically as well as electrically associated with the appropriate surface supported circuits, that is, with circuits which may be integrated circuits, including active components, or seperate associated printed circuits themselves. The switches themselves can be located in suitable openings at the surface of the hollow body, connected with their terminals both mechanically and electrically to the printed circuit board so that unintended removal of the sensing switches is prevented by connection of the printed circuit board with the switches themselves, regardless of whether the connection is the sole support for the switches, or forms only part of the support therefore. To improve accessibility to the interior of the hollow body, the removable cover is preferably so shaped that it has only a single surface on which switches are inserted which, preferably, are connected by means of pigtail, of otherwise flexible wires to the printed circuit board so that testing of all functions to be commanded by the switches on the switch unit body can be carried out. This is particularly important if the switches are of the proximity sensing type, for example, capacitative switches described in the above referred to applications and publications. Removal of the cover, therefore, will not interfere with the overall operation of the electrical functions controlled by all the elements in the hollow body, so that all maintenance and testing steps can be carried out without regard to the mechanical separation of the cover 12 from the remainder of the body.

Forming the switches with a bead of light transmissive material, for example of selected coloring, permits combined mechanical attachment of the switch, provision of a touch-sensitive ridge, and visual indication of operability, or indication of controlled function. This, additionally, permits locating the respective light within the hollow body, with complete protection, and close to the position of the switch, the function of which is being indicated.

The switches are preferably located close to the outer end of the hollow body 1, and the remaining space used to house control relays and the like. Thus, all control operating elements can be included within the body structure, permitting use of a single sturdy housing in an environment more suitable to electrical components than the space beneath the hood of a motor vehicle. Thus, the relays themselves can be commercial items for electrical use, without expensive protection against environmental influences and deterioration due to heat, humidity, and wide changes in ambient conditions. The electrical circuits nececessary to control the functions, preferably grouped together, of electrical elements in a motor vehicle thus can all be located together in the hollow body which forms a switching center for the entire motor vehicle, requiring only connection of the terminal cable, by means of a multiple connector, to the wiring harness within the motor vehicle which then can function purely as a distribution network, with the control functions essentially all concentrated within the hollow body 1 itself. The wires connected to the multiple connector then need only connect to the respective lamps, motors, and the like within the vehicle, in accordance with the functional control to be effected by the switches thereon on the switch box unit 1.

Various change and modifications may be made in the scope of the inventive concept.

What is claimed is:

1. Switchbox and control unit assembly for positioning operating switches of a motor vehicle comprising
   an elongated, multi-faceted cantilevered hollow body structure (1) of essentially polygonal cross section adapted for freely projecting, cantilevered mounting in the motor vehicle;
   attachment means (7) secured at the end of said free standing, cantilevered body for attachment of said body to the motor vehicle and to locate said body spaced from the dashboard of the motor vehicle;
   a plurality of switches adapted for tactile operation (2, 2.12) located in the surfaces defined by the facets of the body and formed with touching surfaces (10);
   surface supported circuits (13) located in the space defined interiorly of the hollow body (1) connected to at least some of said switches;
   and a connection cable (15) passing out of the hollow body in the region of the attachment means, the connection cable being connected interiorly of the body to at least some of the surface supported circuits;
   a printed circuit board (22) within the interior space defined by the hollow body, the printed circuit board being electrically connected to said connecting cable (15) and providing for electrical interconnection of the surface supported circuits (13) and of the switches (2) to said connecting cable;
   and a separable multi-terminal connector (16) electrically and mechanically secured to the connecting cable (15) and forming the electrical output terminal for the switches and the surface supported circuits in the hollow body.

2. Assembly according to claim 1 wherein the free end (8) of the body (7) and opposite the attachment means is formed with inclined angled facet surfaces (3.8).

3. Assembly according to claim 1 wherein the body is formed with elongated essentially plain surfaces (3), and at least one of said surfaces has a plurality of switches (2) located thereon, extending longitudinally along the length of the body (1).

4. Assembly according to claim 3 wherein the switches placed longitudinally along the length of the body on one surface control different operating modes of the same operating function.

5. Assembly according to claim 3, wherein the touching surfaces (10) of the switches are located below the edges thereof defining the circumferential limits of the touching surface.

6. Assembly according to claim 5, further including a frame-like bead (11) surrounding the touching surface (10) of the switch, the bead extending slightly above the plane of the surface of the body on which the switch is located.

7. Assembly according to claim 1 wherein the touching surfaces (10) of the switches are located below the edges thereof defining the circumferential limits of the touching surface.

8. Assembly according to claim 7 further including a frame-like bead (11) surrounding the touching surface (10) of the switch (2).

9. Assembly according to claim 8 wherein the frame-like bead (11) extends slightly above the plane of the surface (3, 12) on which the switch is located.

10. Assembly according to claim 9 wherein the multi-faceted hollow body (1), in cross section, is essentially rectangular having upper and lower narrow sides, extending essentially horizontally, and forward and rear wider sides, extending essentially in vertical planes when the attachment means (7) is secured to a motor vehicle.

11. Assembly according to claim 10 wherein switches located at respectively opposite sides of the body are connected to control respectively similar functions of the motor vehicle.

12. Assembly according to claim 1 wherein the cross section of the elongated faceted body is a polygon having an even number of corners, and symmetrical with respect to a longitudinal central plane.

13. Assembly according to claim 8 wherein at least one of the longitudinal surfaces forms the removable cover (12) for the hollow body.

14. Assembly according to claim 13 wherein at least one of the switches (2.12′) is secured to the removable cover (12);

and flexible connecting wires (21) connect said at least one switch with a respective surface supported circuit (13.12), the surface supported circuit being mechanically retained within the structure of the hollow body separate from the removable cover.

15. Assembly according to claim 1 wherein the surface supported circuits are, respectively associated with a respective switch (2) and are mechanically connected thereto, the surface supported circuit including a support structure forming the rear support of the respectively associated switch within the elongated hollow body (1).

16. Assembly according to claim 1 wherein the surface supported circuits are, respectively, associated with a respective switch (2) and are mechanically connected thereto, the surface supported circuit including a support structure forming the rear support of the respectively associated switch within the elongated hollow body (1).

17. Assembly according to claim 1 wherein the switches (2) comprise capacitative proximity switch sensors.

18. Assembly according to claim 1 wherein the switches comprise push-button type operated switches.

19. Assembly according to claim 1 wherein the switches comprise mechanically contact sensitive switches of the microswitch type.

20. Assembly according to claim 19 further comprising recesses (17) formed within the attachment element (5), and contact-less switches (18) retained within said recesses, the contact-less switches being operated by a contact element (30) secured to the steering post of the motor vehicle, and operated upon rotation of the steering post.

21. Assembly according to claim 1 wherein the attachment means (7) comprise an angled element (5) unitary with the multi-faceted hollow body, and attachment bores secured to said unitary element, shaped to attach said multi-faceted body to the steering post assembly of the motor vehicle.

22. Assembly according to claim 1, wherein the elongated multi-faceted hollow body comprises a unitary element of thermosetting material, formed with openings therein, the switches (2) being secured in the openings of said unitary body.

23. Assembly according to claim 1 comprising frame elements (11) in the form of projecting beads surrounding the switches (2), the frame elements (11) being formed with grooves, and flanges (20) formed on the switches engaged in the grooves of the beads to retain the touch-sensitive switches therein.

24. Assembly according to claim 23 wherein the surface supported circuits (13) are mechanically and electrically connected to associated respective switches at the rear side of said switches and interiorly of the hollow body to provide electrical and mechanical connection of said surface supported circuits to the inrespective switches.

25. Assembly according to claim 24 further comprising a flexible connecting line (21) connecting a respective surface supported circuit (13) to a respective switch (2), the surface supported circuits being secured interiorly to the hollow body (1).

26. Assembly according to claim 23 wherein the beads comprise at least in part light-conductive material and have a translucent exterior surface;

and signal light sources (27b) electrically connected to the respective switch, the signal light sources being in light transmissive relation with respect to the frame of the respective switch to thereby indicate the command operating mode of said switch.

27. Assembly according to claim 1 further comprising signal light openings formed in the hollow body, and signal light sources (27a) located in light transmissive relationship to said openings, the respective signal light sources being associated with respective switches to indicate switch operation.

28. Assembly according to claim 1 further comprising power stages (25) secured to the printed circuit board (22), said printed circuit board being formed with connections (23) for the power stages and for said surface supported circuits (13).

29. Assembly according to claim 28 wherein one elongated surface of the multi-faceted hollow body forms a removable cover;

and wherein said printed circuit board extends essentially parallel to the removable cover (12);

and the attachment means for the surface supported circuits, and for the power stages face away from said removable cover.

30. Assembly according to claim 1 further comprising electrical test points (T) located on the printed circuit board (22) to provide for testing and connection of test elements at selected locations within the circuit formed by the printed circuit board.

31. Assembly according to claim 1 further including logic contol circuits (32.1–32.3) located within the hollow body and secured to the printed circuit board and performing logic interconnection of individual conductors of the connecting cable (15), as commanded by operation of respective switches (2).

32. Assembly according to claim 1 wherein the elongated hollow body comprises an essentially elongated box-like structure of essentially rectangular cross section, the end portion (8) remote from the attachment means (7) being formed with inclined facet surfaces (3.8) to provide, when the attachment means (7) are secured to the steering column of the motor vehicle, an essentially horizontal top surface (3), at least one inclined end surface (3.8) having an upwardly directing face, an end surface (8), having an essentially vertical face at least one inclined end surface (3.8) with a downwardly extending face, and an essentially horizontally extending bottom surface.

33. Assembly according to claim 32 wherein the cross section of the elongated horizontal body becomes greater as the distance from the attachment means (7) toward the other end (8) increases, to provide, an upright plan view, a tapered aspect of an essentially rectangular surface, with removed corners, tapering from a wider free end towards the attachment surface.

* * * * *

UNITED STATES PATENT AND TRADEMARK OFFICE
CERTIFICATE OF CORRECTION

PATENT NO. : 4,131,772
DATED : December 26, 1978
INVENTOR(S) : Albert WECKENMANN et al It is certified that error appears in the above-identified patent and that said Letters Patent are hereby corrected as shown below:

Claim 23, column 13, line 68, "touch-sensitive" should be deleted.

Signed and Sealed this

Third Day of July 1979

[SEAL]

Attest:

Attesting Officer

LUTRELLE F. PARKER
Acting Commissioner of Patents and Trademarks